(12) United States Patent
Rührig

(10) Patent No.: US 6,348,853 B1
(45) Date of Patent: Feb. 19, 2002

(54) SYSTEM FOR THE SUPPLY OF FORGE-PROOF INFORMATION ABOUT AN ARTICLE

(75) Inventor: Manfred Rührig, Weinheim (DE)

(73) Assignee: Meto International GmbH, Hirschhorn (DE)

( * ) Notice: Subject to any disclaimer, the term of this patent is extended or adjusted under 35 U.S.C. 154(b) by 0 days.

(21) Appl. No.: 09/150,099

(22) Filed: Sep. 9, 1998

(30) Foreign Application Priority Data

Oct. 4, 1997 (DE) .......................................... 197 43 829

(51) Int. Cl.$^7$ ................................................ H04Q 1/00
(52) U.S. Cl. .................... 340/5.86; 340/5.61; 340/10.1; 340/572.1; 235/382
(58) Field of Search .............................. 340/5.61, 5.86, 340/10.1, 572.1; 235/380, 457, 382

(56) References Cited

U.S. PATENT DOCUMENTS

| | | | | |
|---|---|---|---|---|
| 3,959,630 A | * | 5/1976 | Hogberg | 235/382 |
| 4,641,017 A | * | 2/1987 | Lopata | 235/457 |
| 4,837,426 A | * | 6/1989 | Pease | 235/380 |
| 5,642,103 A | * | 6/1997 | Tokuda | 340/10.1 |
| 6,116,505 A | * | 9/2000 | Withrow | 235/380 |

FOREIGN PATENT DOCUMENTS

| | | |
|---|---|---|
| DE | 4334537 A1 | 4/1995 |
| DE | 19602588 A1 | 7/1997 |
| DE | 19608777 A1 | 9/1997 |
| FR | 2 731 523 | 9/1996 |
| WO | WO 96/31790 | 10/1996 |
| WO | WO 97/04338 | 2/1997 |

* cited by examiner

Primary Examiner—Brian Zimmerman
(74) Attorney, Agent, or Firm—Jones, Tullar & Cooper, P.C.

(57) ABSTRACT

A system for the supply of forge-proof information about an article. The system has a first element characterized by an information content (I1) and a second element characterized by an information content (I2). Both elements are connected to the article. The two elements are linked to a logic connective where the information contents (I1) and (I2) are compared. One of the information contents relates to a statement as to whether the article is disposable or returnable.

11 Claims, 2 Drawing Sheets

SYSTEM FOR THE SUPPLY OF FORGE-PROOF INFORMATION ABOUT AN ARTICLE

BACKGROUND OF THE INVENTION

1. Field of the Invention

The invention relates to a system for the supply of forge-proof information about an article and, in particular, to a system having two elements associated with unique information, both elements being connected to the article.

2. Related Art

Machine readable bar codes comprising a plurality of line-shaped white and black areas are being used increasingly as replacements for concrete price markings on articles in department stores and warehouses. Bar codes are also being used to check in items of luggage at airports, for example.

A bar code contains a plurality of information contents. One bar code developed by the UCC (Uniform Code Council) is referred to as the UPC (Universal Product Code). This code contains information about the manufacturer of the accordingly marked article as well as a special line arrangement that enables the article and/or price information belonging to the article to be retrieved from a storage device in a clearly defined manner. Furthermore, the code usually contains at least one check character which ensures that the code has been correctly read by the scanner (bar code reader). This bar code reader is conventionally a laser scanner.

Bar codes are easy to forge. This is done most easily by photocopying the bar code, assigning the bar code a lower or higher price according to the particular purpose. Marking with a higher price is meaningful, for example, when the deposit is scanned in automatic deposit dispensers and a credit is booked automatically.

Department stores and warehouses are making increasing use of security elements for electronic article surveillance in addition to the above mentioned bar codes. Inventory losses can be reduced considerably by using security elements of this type.

From published international application WO 97/04338 there is also known a security element which in addition to performing a security function is capable of making an article marked with the security element identifiable, that is, the security element used in the field of electronic article surveillance contains equally a defined information content.

The known security element is constructed as follows. It consists of a first magnetic material of high permeability and low coercive force and a second material that can be permanently magnetized. The second material is differently magnetized in different zones. As a result of this different magnetization in different zones, the security element emits a characteristic signal in the field of an electromagnetic interrogating device, allowing unmistakable conclusions to be drawn about the secured article.

SUMMARY OF THE INVENTION

Proceeding from the state-of-the-art, it is an object of the present invention to provide an element with a defined information content so that it cannot be forged.

This object is accomplished in that the first and second information contents (I1, I2) of the two elements are linked by a logic connection.

According to an advantageous aspect of the system of the present invention, the first element is a security element which emits a characteristic signal in the field of an electronic interrogating device. It is equally possible, however, for the first element to be a bar code or some other element, provided this element is able to supply an unambiguous information content.

In cases where the first element is a security element for electronic article surveillance, the security element has in an advantageous further aspect a characteristic signal shape that enables the assigned article to be identified unambiguously. Alternatively, the characteristic signal can lie within a clearly defined frequency range. It is possible furthermore to make use of all possibilities capable of assigning a defined information content to the security element.

In an advantageous further aspect of the system of the present invention, it is proposed for the second element to be a bar code or some other machine readable code.

As soon as the characteristic signal of the electronic security element and that of the bar code have been entered into an input device, the information contents held in a storage unit and assigned to the particular signal are retrieved. The first and second information contents (I1, I2) of the two elements are a, compared with each other in a computing unit. It is only if the two information contents are in a predefined relationship to each other that the bar code's price information, for example, will be accepted as correct.

The system of the present invention is suitable for use in an automatic deposit dispenser, for example. In this case, the 10 information content of the first element, meaning the security element, enables an unambiguous statement to be made as to whether the article involved is disposable or returnable; if the characteristic signal shape reveals it to be a returnable article, the second element supplies the information about what type of returnable article is involved.

Using the second element, meaning the code, a check is then carried out to see whether the information contents of the first and the second element, meaning the security element and the code, are linked by a predetermined logic connective. The article is not treated as returnable until the predetermined logic connective is confirmed.

In accordance with an advantageous further aspect of the system of the present invention, this logic connection is created by having the characteristic signal display a defined shape and having this shape serve as proof of the code's authenticity. This special shape is identifiable from the number of peaks, from the shape of the individual peaks, or from the frequency range in which the characteristic signal lies.

To make it impossible for the elements to be manipulated, an advantageous further aspect of the system of the present invention provides for the first element, meaning the security element, to be integrated in the article or its packaging in such a way that it cannot be recognized, from the outside. This prevents the interaction of the two elements being destroyed by removal or replacement of the security element.

BRIEF DESCRIPTION OF THE DRAWINGS

The present invention will be described in more detail in the following with reference to the accompanying drawings. In the drawings.

DETAILED DESCRIPTION OF THE INVENTION

Figure 1:
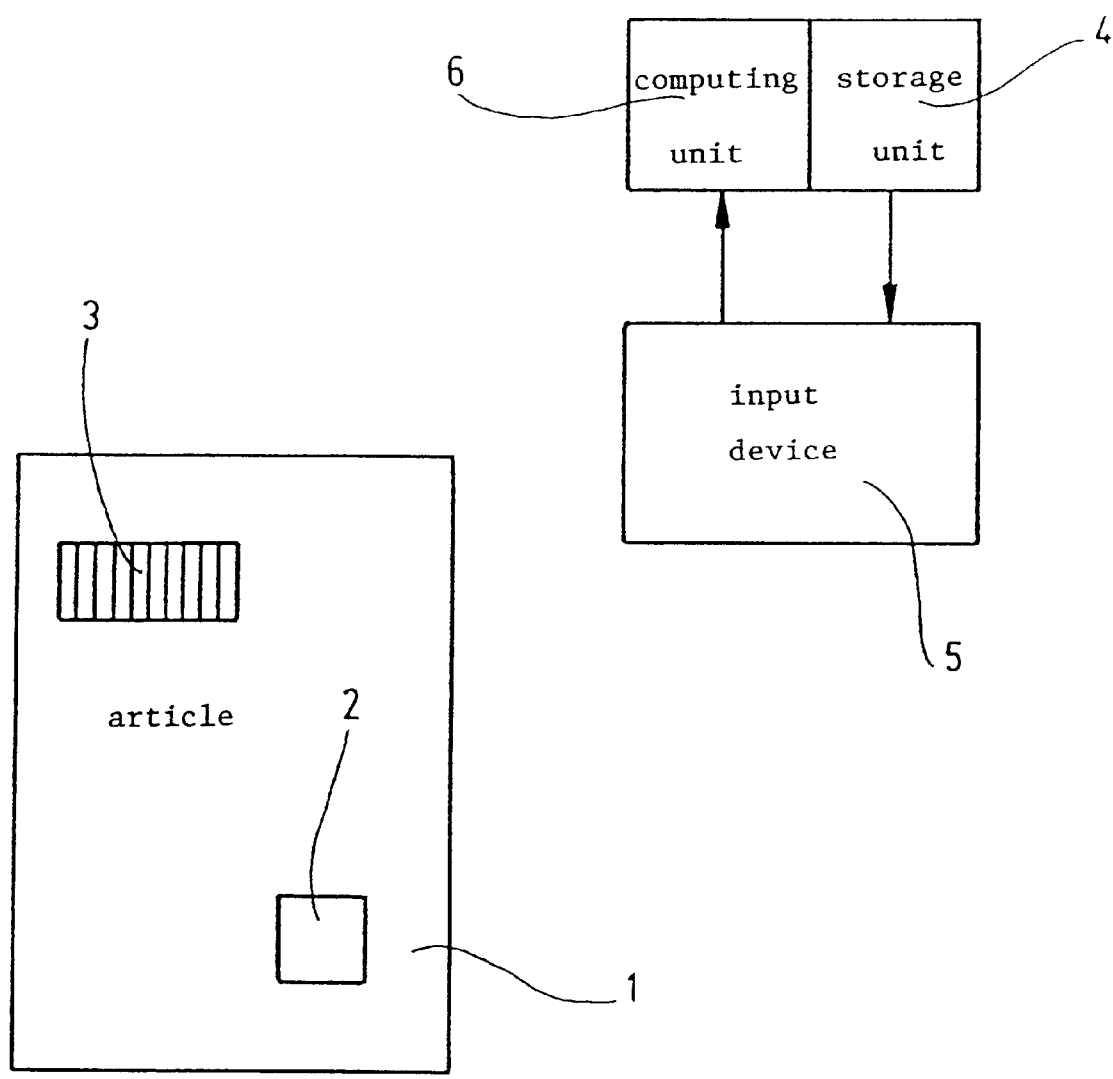
FIG. 1 is a representation of an article equipped with the system of the present invention.

FIG. 1 illustrates an article 1 equipped with the system of the present invention. The article 1 is provided with a first element 2 and a second element 3. Advantageously, the first element 2 is a security element that emits a characteristic signal which is unambiguously assignable to a predefined first information content I1, in an electromagnetic interrogating field. The same applies to the second element 3, which in the embodiment shown is a bar code. This bar code is likewise assigned an unambiguous information content I2. Both first and second information contents I1, I2 are linked by a logic connective so that the information content of the second element 3 is accepted as given only if the predefined link to the first element 2 by logic connective is confirmed.

Figure 2:
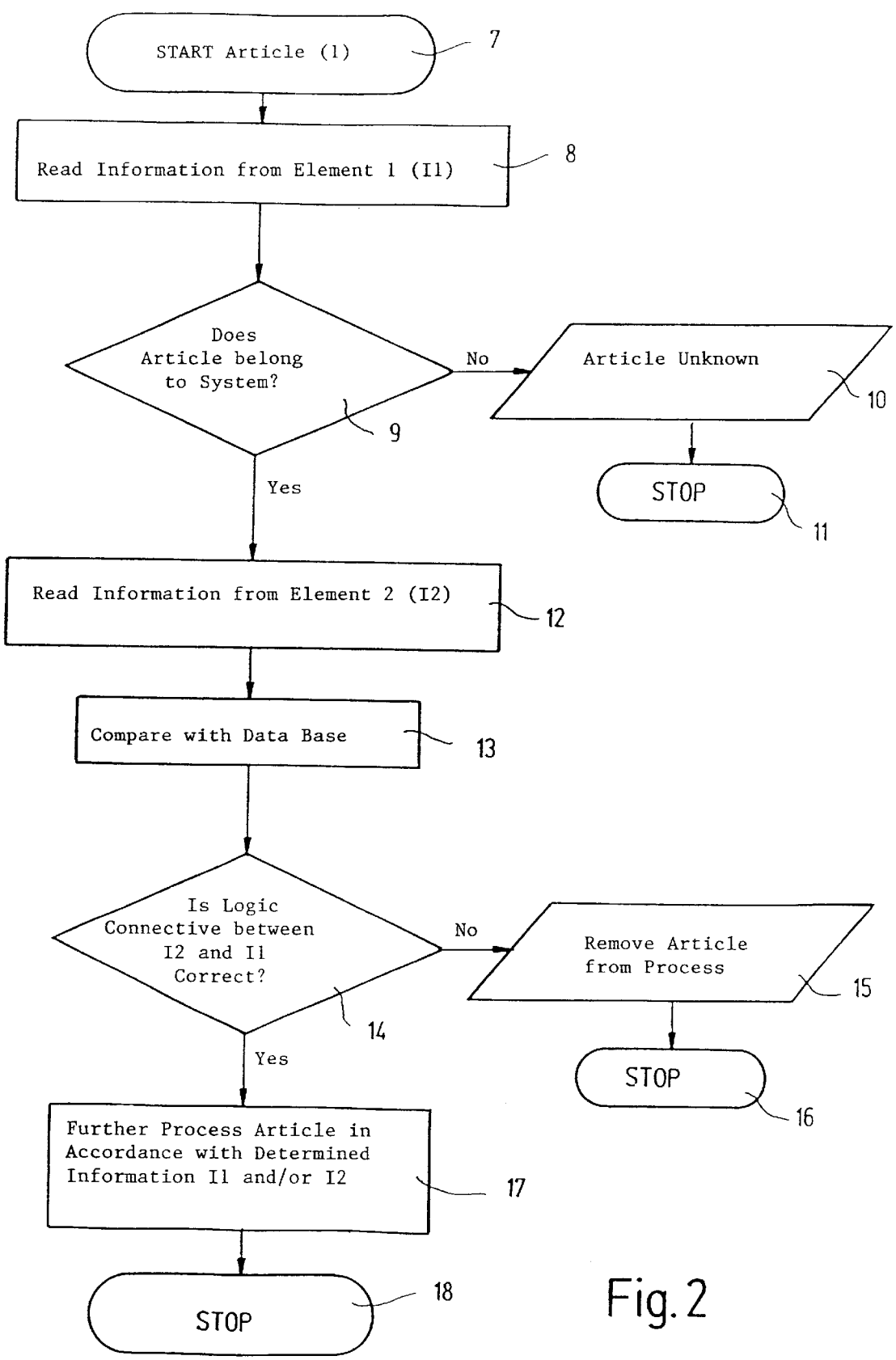
FIG. 2 is a flowchart illustrating the evaluation of the information contents of the two elements.

FIG. 2 shows a flowchart for the evaluation of the information contents of the two elements 2, 3. The evaluation is performed by a computing unit 6. The program is started at point 7. The article 1 is equipped with the elements 2, 3. The first information content I1 of the first element 2, which is a security element, is read at point 8. From the first information content I1 the computing unit 6 is able to see whether or not the article belongs to the system, meaning, for example, that a decision is taken as to whether or not the article is returnable. If the computing unit identifies the article 1 as not belonging to the system, the article 1 is rejected at point 10, and the program is stopped at point 11.

The information content I2 of the second element 3 is read at point 12. The information content is compare with the information held in the storage unit 4. At point 14, the program checks whether the predetermined logic connection exists between the first and second information contents I1, I2 of the two elements 2, 3. In the absence of the logic connective, the article is removed from the system at point 15, and the program is aborted at point 16.

If the predefined link by logic connection does exist between the information contents I1, I2, the properties of article 1 will be known from the first and second information contents I1, I2. The article 1 will then be further processed at point 17 in accordance with the properties determined from the two elements 2, 3. In concrete terms for the case of a deposit return, this means that the deposit is paid or credited and/or the article 1 is sorted according to its properties. The evaluation of the article 1 is completed at point 18, and the program is stopped.

What is claimed is:

1. A system for the supply of forge-proof information about an article, comprising:

a first element associated with a first information content;

a second element associated with a second information content, both said first element and said second element being connected to the article; and the first information content and the second information content are linked by a logic connection so that the first and second information contents of the two elements can be compared with each other in a computing unit and the second information content of the second element is accepted as given only if the predefined link to the first element by said logic connection is confirmed, wherein the first information content relates to a statement as to whether the article is disposable or returnable, and the second information content relates to the type of returnable article involved when the statement from the first information content relates to a retunable article.

2. The system as defined in claim 1, wherein said first element comprises a security element which emits a characteristic signal in the field of an electronic interrogating device.

3. The system as defined in claim 2, wherein said security element has an identifiable characteristic signal shape, said identifiable characteristic signal shape lying within a clearly defined frequency range.

4. The system as defined in claim 2, wherein said second element comprises a machine readable code.

5. The system as defined in claim 2, wherein the characteristic signal comprises a defined shape, and this defined shape serves as proof of the code's authenticity.

6. The system as defined in claim 4, wherein said machine readable code comprises a bar code.

7. The system as defined in claim 1, further comprising:

a storage unit which holds data relating to said first element and said second element.

8. The system as defined in claim 1, further comprising:

an input device; and a computing device connected to said input device, wherein said first element emits a characteristic signal, said second element comprises a machine readable code, and said input device transmits the characteristic signal and the code to said computing unit where the first information content and the second information content is compared.

9. The system as defined in claim 1, wherein a check is carried out with said second element to determine whether a predetermined logic connection exists between the first information content and the second information content, and wherein the article involved is not treated as a returnable article until the predetermined logic connection is confirmed.

10. The system as defined in claim 1, wherein said first element is integrated in the article in such a way that it cannot be recognized from outside of the article.

11. The system as defined in claim 1, wherein said first element is integrated into the packaging of the article in such a way that it can not be recognized from outside of the packaging.

* * * * *